(12) United States Patent
Tajima et al.

(10) Patent No.: US 9,111,553 B2
(45) Date of Patent: Aug. 18, 2015

(54) OPTICAL INFORMATION RECORDING MEDIUM, REPRODUCTION APPARATUS, AND REPRODUCTION METHOD

(71) Applicant: Sharp Kabushiki Kaisha, Osaka-shi, Osaka (JP)

(72) Inventors: Hideharu Tajima, Osaka (JP); Atsushi Etoh, Osaka (JP); Go Mori, Osaka (JP); Masaki Yamamoto, Osaka (JP); Tetsuya Hayashi, Osaka (JP); Toshihiko Sakai, Osaka (JP); Hirohisa Yamada, Osaka (JP); Takayuki Naka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/362,998

(22) PCT Filed: Dec. 7, 2012

(86) PCT No.: PCT/JP2012/081741
§ 371 (c)(1),
(2) Date: Jun. 5, 2014

(87) PCT Pub. No.: WO2013/089022
PCT Pub. Date: Jun. 20, 2013

(65) Prior Publication Data
US 2015/0043322 A1 Feb. 12, 2015

(30) Foreign Application Priority Data
Dec. 12, 2011 (JP) .................. 2011-271556

(51) Int. Cl.
*G11B 7/005* (2006.01)
*G11B 7/24085* (2013.01)
(Continued)

(52) U.S. Cl.
CPC ............ *G11B 7/24085* (2013.01); *G11B 7/005* (2013.01); *G11B 7/00736* (2013.01); *G11B 7/1374* (2013.01); *G11B 7/24065* (2013.01); *G11B 2220/2541* (2013.01); *G11B 2220/2595* (2013.01)

(58) Field of Classification Search
None
See application file for complete search history.

(56) References Cited

U.S. PATENT DOCUMENTS 6,965,556 B1 11/2005 Kikukawa et al.
7,459,194 B2 * 12/2008 Yamamoto et al. .......... 428/64.1
(Continued)

FOREIGN PATENT DOCUMENTS

JP 10-011761 A 1/1998
JP 2001-035012 A 2/2001
(Continued)

OTHER PUBLICATIONS

Official Communication issued in International Patent Application No. PCT/JP2012/081741, mailed on Jan. 22, 2013.

*Primary Examiner* — Wayne Young
*Assistant Examiner* — Brian Butcher
(74) *Attorney, Agent, or Firm* — Keating & Bennett, LLP

(57) ABSTRACT

The reliability of a super-resolution optical information recording medium whose capacity can be increased is increased. On an optical information recording medium (11) according to the present invention, a content is recorded as a pit group formed such that an average length Tm [nm] of a minimum mark length and a minimum space length becomes shorter than an optical system resolution limit, and reading speed information designating a reading speed in a range from $2 \times (4.92 \times Tm/149)$ [m/s] to less than $(10000/60) \times 2 \times \pi \times (24/1000)$ [m/s] is recorded as a reading speed for reproducing the content.

3 Claims, 7 Drawing Sheets

(51) Int. Cl.
*G11B 7/007* (2006.01)
*G11B 7/1374* (2012.01)
*G11B 7/24065* (2013.01)

(56) References Cited

U.S. PATENT DOCUMENTS

2007/0002697 A1* 1/2007 Schuller .................... 369/30.07
2009/0080311 A1   3/2009 Shintani et al.
2010/0083295 A1*  4/2010 Eto et al. ..................... 720/695

FOREIGN PATENT DOCUMENTS

| JP | 2001-250274 A | 9/2001 |
| JP | 2006-134445 A | 5/2006 |
| JP | 2009-076134 A | 4/2009 |

* cited by examiner

F I G. 8
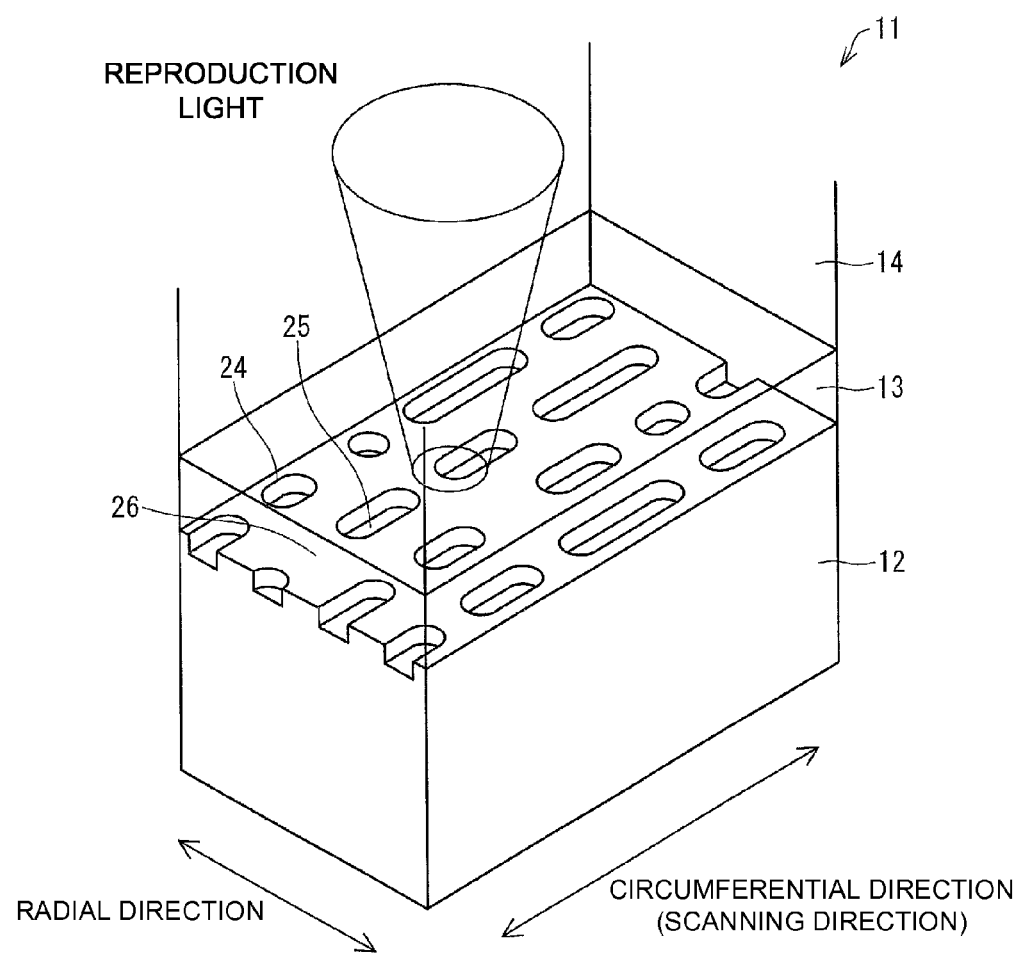

OPTICAL INFORMATION RECORDING MEDIUM, REPRODUCTION APPARATUS, AND REPRODUCTION METHOD

TECHNICAL FIELD

The present invention relates to a read-only optical information recording medium which optically reproduces information, an optical information recording medium reproduction method, and an optical information recording medium reproduction apparatus.

BACKGROUND ART

In recent years, optical information recording media have been required to have larger and larger information recording capacity for processing of a vast amount of information such as images. As a method of solution of this, there is a method using the super-resolution technology which is one of the information processing enhancement technology at the time of reproduction.

The super-resolution technology is the technology for reproducing a signal of a mark length which is shorter than an optical system resolution limit (a limit determined by a laser wavelength and the numerical aperture of an optical system) of a reproduction apparatus. This makes it possible to perform recording using a smaller mark length, whereby substantial recording density is increased. This is because what becomes a problem in achieving higher density is a reproduction technology, not a recording technology.

Of these technologies, the super-resolution technology will be described first.

In the past, many optical information recording media (hereinafter referred to as super-resolution optical information recording media or super-resolution media) for reproducing a signal of a mark length which is shorter than an optical system resolution limit of a reproduction apparatus have been proposed.

As such a technology, as a technology that can be applied to a read-only medium on which non-rewritable information is recorded as depressions and projections of a substrate, there is the technology for providing a layer called a functional layer formed of a thin metal film or the like on a substrate on which information is recorded as any one of depressions and projections or both (refer to PTL 1).

Although most of the principles of the above-described super-resolution medium related to PTL 1 have not been made clear at present, a signal of a mark length which is shorter than an optical system resolution limit can be reproduced by a change in the temperature of the above-described functional layer.

Moreover, as another technology to which a read-only medium can also be applied, the technology for providing, as a mask layer, a thermochromic pigment layer whose optical performance (transmittance) varies with a temperature on a reproduction light incidence surface of a reflective film has also been known (refer to PTL 2).

Incidentally, the mask layer is a layer that causes a super-resolution phenomenon by, for example, reducing a laser spot, which will be described later, in a pseudo manner.

In these optical information recording media, the fact that a light intensity distribution is present in a laser spot caused by a reproduction laser with which a reproduction surface is irradiated and a temperature distribution is caused thereby is used.

More specifically, in a reproduction laser spot on a mask layer which is closer to a reproduction light incidence surface than a reflecting layer, a temperature or light intensity distribution is caused, which causes the distribution of optical performance in the laser spot.

For example, if a material whose transmittance becomes higher when the temperature rises is used as a mask layer, since only the transmittance in a high-temperature portion becomes higher, a laser spot that is generated on a reflecting layer surface is reduced in a pseudo manner. As a result, it is possible to reproduce a signal of a mark length which is shorter than an optical system resolution limit.

However, in the super-resolution reproduction technology, since a laser spot is reduced in a pseudo manner by masking a laser light, the use efficiency of a reproduction light is reduced (a reflected light from a reflecting layer is naturally reduced). As a result, a limitation is imposed on a reduction of a laser spot, and enhancement of recording density has been limited to about double density in terms of linear density.

In the past, as described above, a method for increasing the capacity of the optical information recording medium using the super-resolution technology has been proposed.

CITATION LIST

Patent Literature

PTL 1: Japanese Unexamined Patent Application Publication No. 2001-250274
PTL 2: Japanese Unexamined Patent Application Publication No. 2001-035012

SUMMARY OF INVENTION

Technical Problem

However, in both of the super-resolution technologies of PTLs 1 and 2, since the heat that is generated by irradiation with a reproduction light is used, it is necessary to emit a high-intensity reproduction light in general as compared to a case where a mark which is longer than an optical system resolution limit is reproduced.

Furthermore, as in PTLs 1 and 2, since materials themselves that are used in the optical information recording medium often have low heat resistance and the film thickness of each layer is small, the heat resistance of the optical information recording medium is low. Therefore, if the intensity of the reproduction light is increased, the optical information recording medium tends to degrade. Therefore, a super-resolution optical information recording medium has a problem in reproduction durability.

To solve the above-described problem, a balance between radiation performance and super-resolution performance may be achieved by combining a plurality of layers in the super-resolution medium. However, this is difficult to put into practical use, and, in particular, in a read-only super-resolution medium, since there is a large difference in costs between the read-only super-resolution medium and a normal read-only optical information recording medium that uses simply a single-layer reflective film formed of a silver alloy or the like and does not perform super-resolution reproduction, the read-only super-resolution medium is not widely used at present.

The present invention has been made in view of the problem described above, and an object thereof is to provide a high-reliability read-only super-resolution optical information recording medium whose capacity can be increased and to provide a reproduction method and a reproduction apparatus with which reliability is increased when the read-only super-resolution optical information recording medium is reproduced.

Solution to Problem

An optical information recording medium according to the present invention is directed to a read-only optical information recording medium on which a content is recorded as a pit group formed such that an average length Tm [nm] of a minimum mark length and a minimum space length becomes shorter than an optical system resolution limit of a reproduction apparatus in which the numerical aperture of an objective lens is 0.85 and the wavelength of a reproduction light is 405 [m], wherein, as a reading speed for reproducing the content, reading speed information designating a reading speed in a range from 2×(4.92×Tm/149) [m/s] to less than (10000/60)× 2×π×(24/1000) [m/s] is recorded.

Here, in a normal Blu-ray Disc® (BD)-ROM supporting the numerical aperture of 0.85 of the objective lens and the wavelength of 405 nm of the reproduction light, a normal reading speed (a single-speed reading speed) is 4.92 [m/s], and the average length of a minimum mark length and a minimum space length is 149 [nm]. The radius of an innermost periphery of a recording area of a normal BD is 24 [mm]. On the other hand, a reading speed at the time of reproduction of marks and spaces whose average length Tm is shorter than the optical system resolution limit by using a single-speed reading clock corresponding to the single-speed reading speed is (4.92×Tm/149) [m/s].

With the configuration described above, the reading speed information designates a reading speed in a range from 2×(4.92×Tm/149) [m/s] to less than (10000/60)×2×π×(24/1000) [m/s] as a reading speed. The reading speed in the above range is faster than a reading speed (4.92×Tm/149) [m/s] that is adopted when a single-speed clock of a BD-ROM (recording capacity: 25 GB) is used, the BD-ROM which is a typical optical information recording medium supporting a reproduction apparatus in which the numerical aperture of an objective lens is 0.85 and the wavelength of a reproduction light is 405 [nm]. As a result, an increase in a reproduction light output needed for super-resolution reproduction is small as compared to an increase in a reading speed. Therefore, as compared to a case where the content is reproduced at a reading speed that is adopted when a single-speed clock is used, it is possible to reduce the amount of received reproduction light per unit area of the optical information recording medium and per unit time. Moreover, even when the information in a position on the innermost periphery (radius: 24 [mm]) is reproduced, the rotation speed of the optical information recording medium does not become 10000 rpm or more. This makes it possible to prevent a breakdown of the optical information recording medium by centrifugal force. Therefore, it is possible to suppress degradation of the optical information recording medium by reproduction and increase the reliability of the optical information recording medium.

Moreover, the optical information recording medium may have a shape of a circular plate and have a first area in which the content is recorded and a second area in which the reading speed information is recorded, and the second area may be disposed in a position closer to the inner periphery side than the first area.

Furthermore, in the first area, the content may be recorded as a pit group formed such that the average length Tm becomes shorter than the optical system resolution limit of the reproduction apparatus, and, in the second area, the reading speed information may be recorded as a pit group formed such that the average length of a minimum mark length and a minimum space length becomes longer than the optical system resolution limit of the reproduction apparatus.

The optical information recording medium may be configured such that reproduction light output information designating a reproduction light output corresponding to the reading speed indicated by the reading speed information is recorded.

The optical information recording medium may be configured such that the content is recorded as a pit group including a pit whose length in a scanning direction is shorter than the optical system resolution limit of the reproduction apparatus.

A reproduction apparatus according to the present invention is directed to a reproduction apparatus in which the numerical aperture of an objective lens is 0.85 and the wavelength of a reproduction light is 405 nm, the reproduction apparatus including a reproducing unit that reproduces a content at a reading speed that is 2×(4.92×Tm/149) [m/s] or more but less than (10000/60)×2×π×(24/1000) [m/s] when a read-only optical information recording medium on which the content is recorded as a pit group formed such that an average length Tm [nm] of a minimum mark length and a minimum space length becomes shorter than an optical system resolution limit of the reproduction apparatus.

With the configuration described above, the content is reproduced at a reading speed in a range that is 2×(4.92×Tm/149) [m/s] or more but less than (10000/60)×2×π×(24/1000) [m/s]. The reading speed in the above range is faster than a reading speed (4.92×Tm/149) [m/s] that is adopted when a single-speed clock of a BD-ROM (recording capacity: 25 GB) is used, the BD-ROM which is a typical optical information recording medium supporting a reproduction apparatus in which the numerical aperture of an objective lens is 0.85 and the wavelength of a reproduction light is 405 [nm]. As a result, an increase in a reproduction light output needed for super-resolution reproduction is small as compared to an increase in a reading speed. Therefore, as compared to a case where the content is reproduced at a reading speed that is adopted when a single-speed clock is used, it is possible to reduce the amount of received reproduction light per unit area of the optical information recording medium and per unit time. Moreover, even when the information in a position on the innermost periphery (radius: 24 [mm]) is reproduced, the rotation speed of the optical information recording medium does not become 10000 rpm or more. This makes it possible to prevent a breakdown of the optical information recording medium by centrifugal force. Therefore, it is possible to suppress degradation of the optical information recording medium by reproduction and perform reproduction with high reliability.

Moreover, the reproduction apparatus may include an output controlling unit that controls, if (4.92×Tm/149) [m/s] is set as a first reading speed and a reproduction light output corresponding to the first reading speed is set as a first reproduction light output, the reproduction light output such that the increase ratio of a reproduction light output to the first reproduction light output becomes smaller than the increase ratio of a reading speed to the first reading speed at the time of reproduction of the content.

A reproduction method according to the present invention is directed to a reproduction method for reproducing a read-only optical information recording medium on which a content is recorded as a pit group formed such that an average length Tm [nm] of a minimum mark length and a minimum space length becomes shorter than an optical system resolution limit of a reproduction apparatus in which the numerical aperture of an objective lens is 0.85 and the wavelength of a reproduction light is 405 [nm], wherein the content is reproduced at a reading speed that is 2×(4.92×Tm/149) [m/s] or more but less than (10000/60)×2×π×(24/1000) [m/s] by irradiating the optical information recording medium with the reproduction light with a wavelength of 405 nm via the objective lens with a numerical aperture of 0.85.

With the configuration described above, the content is reproduced at a reading speed in a range that is 2×(4.92×Tm/149) [m/s] or more but less than (10000/60)×2×π×(24/1000) [m/s]. The reading speed in the above range is faster than a reading speed (4.92×Tm/149) [m/s] that is adopted when a single-speed clock of a BD-ROM (recording capacity: 25 GB) is used, the BD-ROM which is a typical optical information recording medium supporting a reproduction apparatus in which the numerical aperture of an objective lens is 0.85 and the wavelength of a reproduction light is 405 [nm]. As a result, an increase in a reproduction light output needed for super-resolution reproduction is small as compared to an increase in a reading speed. Therefore, as compared to a case where the content is reproduced at a reading speed that is adopted when a single-speed clock is used, it is possible to reduce the amount of received reproduction light per unit area of the optical information recording medium and per unit time. Moreover, even when the information in a position on the innermost periphery (radius: 24 [mm]) is reproduced, the rotation speed of the optical information recording medium does not become 10000 rpm or more. This makes it possible to prevent a breakdown of the optical information recording medium by centrifugal force. Therefore, it is possible to suppress degradation of the optical information recording medium by reproduction and perform reproduction with high reliability.

Advantageous Effects of Invention

As described above, according to the present invention, the content is reproduced at a reading speed in a range that is 2×(4.92×Tm/149) [m/s] or more but less than (10000/60)×2×π×(24/1000) [m/s]. As a result, an increase in a reproduction light output needed for super-resolution reproduction is small as compared to an increase in a reading speed. Therefore, as compared to a case where the content is reproduced at a reading speed that is adopted when a single-speed clock is used, it is possible to reduce the amount of received reproduction light per unit area of the optical information recording medium and per unit time. Moreover, even when the information in a position on the innermost periphery (radius: 24 [mm]) is reproduced, the rotation speed of the optical information recording medium does not become 10000 rpm or more. This makes it possible to prevent a breakdown of the optical information recording medium by centrifugal force. Therefore, it is possible to suppress degradation of the optical information recording medium by reproduction and perform reproduction with high reliability.

BRIEF DESCRIPTION OF DRAWINGS

FIG. 8 is a perspective view depicting the structure of pits provided in a substrate of another optical information recording medium.

DESCRIPTION OF EMBODIMENTS

Reading Speed and Reproduction Durability

As a result of examinations, the inventor of the present application has found out that it is possible to increase reproduction durability while maintaining super-resolution performance by reproducing a read-only super-resolution optical information recording medium (super-resolution medium) with an increase in a reading speed. First, the reason why reproduction durability can be increased will be described below.

As described earlier, at the time of super-resolution reproduction of the super-resolution medium, since it is necessary to generate heat by irradiation with a reproduction light, the intensity of the reproduction light (reproduction light output) with which the super-resolution medium is irradiated has to be increased as compared to a case where reproduction of a normal optical information recording medium, which is not super-resolution reproduction, is performed.

However, at the same time, this increase in the reproduction light output impairs the reproduction durability of the super-resolution medium.

This makes it difficult to handle both performing super-resolution reproduction and reproduction durability. However, as a result of examinations, the inventor of the present application has found out that it is possible to handle performing super-resolution reproduction and reproduction durability by increasing a reading speed.

In reproduction of the super-resolution medium, if the reading speed is increased, since the time in which a predetermined area of the super-resolution medium is irradiated with the reproduction light is reduced, damage to the super-resolution medium is reduced. On the other hand, since the heat that is generated in the area by irradiation with the reproduction light is also reduced, it is necessary to further increase the intensity of the reproduction light with which the area is irradiated.

However, the inventor of the present application has found out that the degree of an increase in the reproduction light output needed in response to an increase in the reading speed is smaller than the degree of an increase in the reading speed. That is, as compared to a case where the super-resolution medium is reproduced at a normal reading speed, by reproducing the super-resolution medium while increasing both the reading speed and the reproduction light output, it is possible to suppress degradation of the super-resolution medium caused by heat generation at the time of reproduction. In other words, by reproducing the super-resolution medium while increasing both the reading speed and the reproduction light output, it is possible to increase the reproduction durability of the super-resolution medium.

Test Results

Hereinafter, a reproduction durability verification test will be described.

Figure 1:
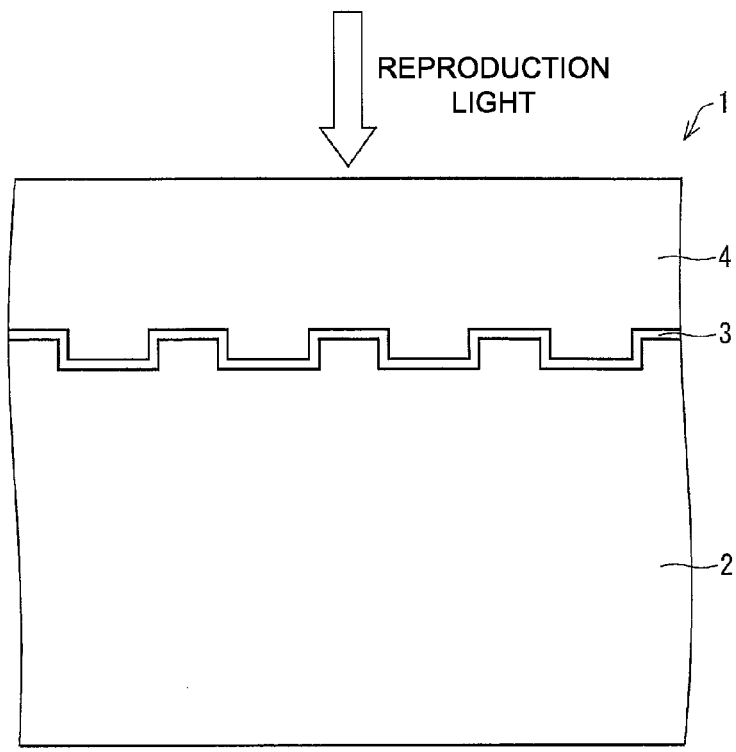
FIG. 1 is a sectional view of an optical information recording medium used in a verification test.

FIG. 1 is a sectional view of an optical information recording medium 1 used in a verification test. As depicted in FIG. 1, the optical information recording medium 1 is formed by stacking an information recording layer (a functional layer) 3 and a transparent layer 4 on a substrate 2 in this order. The optical information recording medium 1 is a super-resolution medium including a mark or a space which is shorter than an optical system resolution limit.

The substrate 2 is formed of polycarbonate. On a surface (an information recording surface) of the substrate 2 on the side where the information recording layer 3 is located, a pit group composed of depressions and projections having the shapes appropriate to information to be recorded is formed.

The information recording layer 3 is a thin film formed along the depressions and projections of the information recording surface of the substrate 2 and is a functional layer that makes super-resolution reproduction possible. Specifically, the information recording layer 3 is a layer of a Ta thin film measuring 5 nm in thickness.

The transparent layer 4 is formed of ultraviolet curable resin (whose refractive index is 1.50 when a reproduction light wavelength λ=405 nm) measuring 100 μm in thickness. The transparent layer 4 has a reproduction light incidence surface and protects the information recording layer 3 and the information recording surface of the substrate 2.

Figure 2:
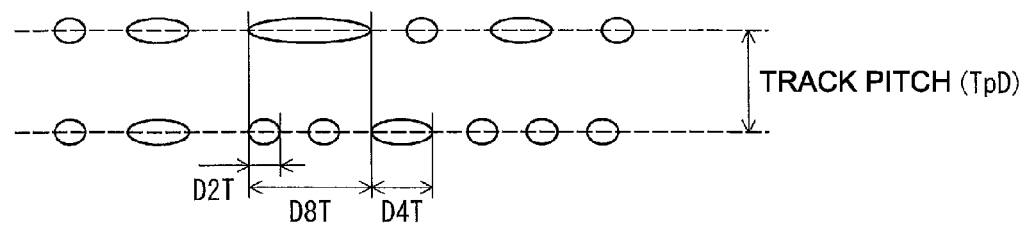
FIG. 2 is a plan view depicting pits on a substrate of the optical information recording medium.

FIG. 2 is a plan view depicting pits on the substrate 2 of the optical information recording medium 1. Information to be recorded is recorded on the optical information recording medium 1 as marks of a plurality of lengths (D2T to D8T) and spaces in accordance with the 1-7RLL modulation method. Here, the pit formed in the optical information recording medium 1 represents a mark, and the spacing between the pits along the track represents a space. The marks of the plurality of lengths and the spaces are provided in such a way that the average of a minimum mark length (D2T) and a minimum space length becomes 112 nm which is shorter than an optical system resolution limit (119 nm). Here, both the minimum mark length and the minimum space length are D2T. Incidentally, a track pitch TpD of the pits is 0.32 μm which is the same as that of a normal Blu-ray disc@ (BD)-ROM. In the optical information recording medium 1, since the minimum mark length is shorter than the minimum mark length (149 nm) of the normal BD-ROM (which is a disc measuring 120 mm in diameter and can store 25 GB) and it is possible to record information densely, information of about 33.3 GB can be recorded on a disc measuring 120 mm in diameter.

Figure 3:
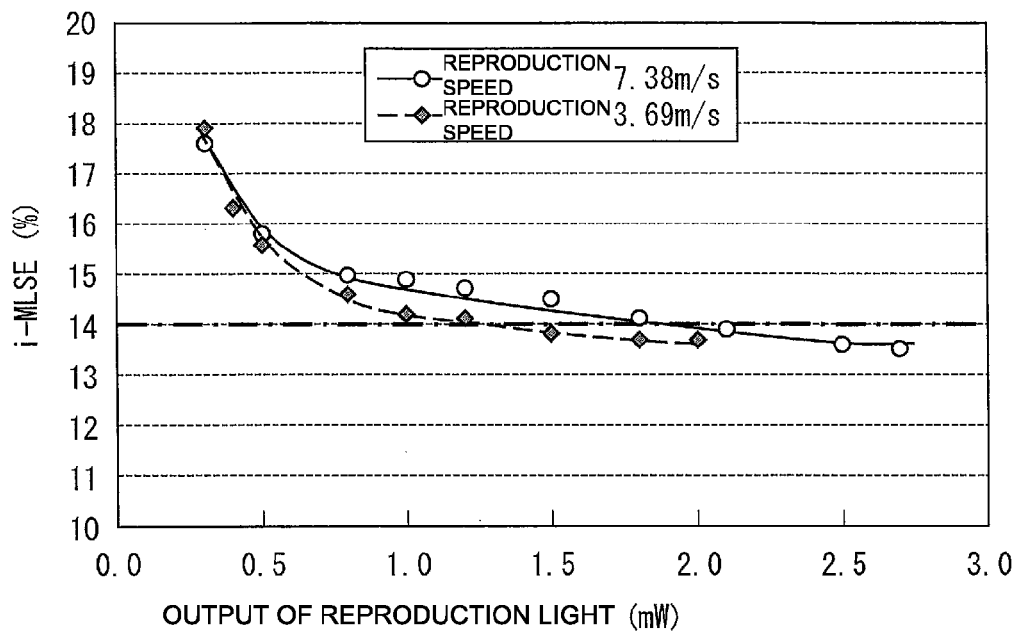
FIG. 3 is a graph of the measurement results of the dependence of the i-MLSE indicating signal performance on a reproduction light output in the optical information recording medium.

FIG. 3 is a graph of the measurement results of the dependence of the i-MLSE indicating signal performance on a reproduction light output in the optical information recording medium 1. The i-MLSE (maximum likelihood sequence estimation) is a common evaluation index of signal reproduction performance in high-density recording; the smaller the i-MLSE, the higher the signal performance. Incidentally, the i-MLSE of the optical information recording medium 1 was measured by using an evaluation apparatus for BD (DDU-1000 manufactured by Pulstec Industrial Co. Ltd./a reproduction optical system with a reproduction light wavelength (λ) of 405 nm and a numerical aperture (NA) of 0.85) and Signal Detector 3 for BD evaluation manufactured by Pulstec Industrial Co. Ltd. and changing the output of the reproduction light (the reproduction light power) (that is, by changing the irradiation intensity of the reproduction light).

In a main verification test, the signal performance was measured at a reading speed (linear speed) of 3.69 m/s and a reading speed of 7.38 m/s twice as fast as the reading speed (linear speed) of 3.69 m/s. These reading speeds correspond respectively to a reading clock at the time of normal reproduction (single-speed reading) of a BD-ROM (with a minimum mark length of 149 nm) which is a normal optical information recording medium and a reading clock at the time of double-speed reading (whose clock interval is one half of that of the reading clock at the time of normal reproduction and clock frequency is twice as high as that of the reading clock at the time of normal reproduction). In the normal BD-ROM, a minimum mark length is 149 nm and a reading speed is 4.92 m/s. When the same clock is used, since the density of pits of the optical information recording medium 1 is higher than that of the normal BD-ROM, the reading speed of single-speed reading of the optical information recording medium 1 becomes 3.69 (m/s) (=4.92 (m/s)/149 (nm)×112 (nm)). Likewise, the reading speed of double-speed reading of the optical information recording medium 1 becomes 7.38 (m/s) (=2×4.92 (m/s)/149 (nm)×112 (nm)).

As is clear from FIG. 3, at both reading speeds, when the output of the reproduction light increases, super-resolution performance appears and the i-MLSE becomes smaller (signal performance is enhanced). If the reading speed was 3.69 m/s, the reproduction light output at which the i-MLSE became 14%, which can be said to be a feasible level as a reproducing medium, was 1.5 mW. Moreover, if the reading speed was 7.38 m/s, the reproduction light output at which the i-MLSE became 14% was 2.1 mW (=1.5 (mW)×1.4). This indicates that, even when the reading speed is increased by a factor of 2, an increase in the reproduction light output needed to obtain the same degree of signal performance as that of single-speed reading is a √2-times increase.

Incidentally, this result substantially coincides with the result indicating that, in a rewritable optical information recording medium, in general, when a "recording" speed is doubled, a √2-times output is needed as an output of a recording light.

Next, to evaluate reproduction durability, in a case where a reading speed was 3.69 m/s and a reproduction light output was 1.5 mW and a case where a reading speed was 7.38 m/s and a reproduction light output was 2.1 mW, the dependence of the i-MLSE of the optical information recording medium 1 on the number of times of reproduction was measured by using the above-described evaluation apparatus.

Figure 4:
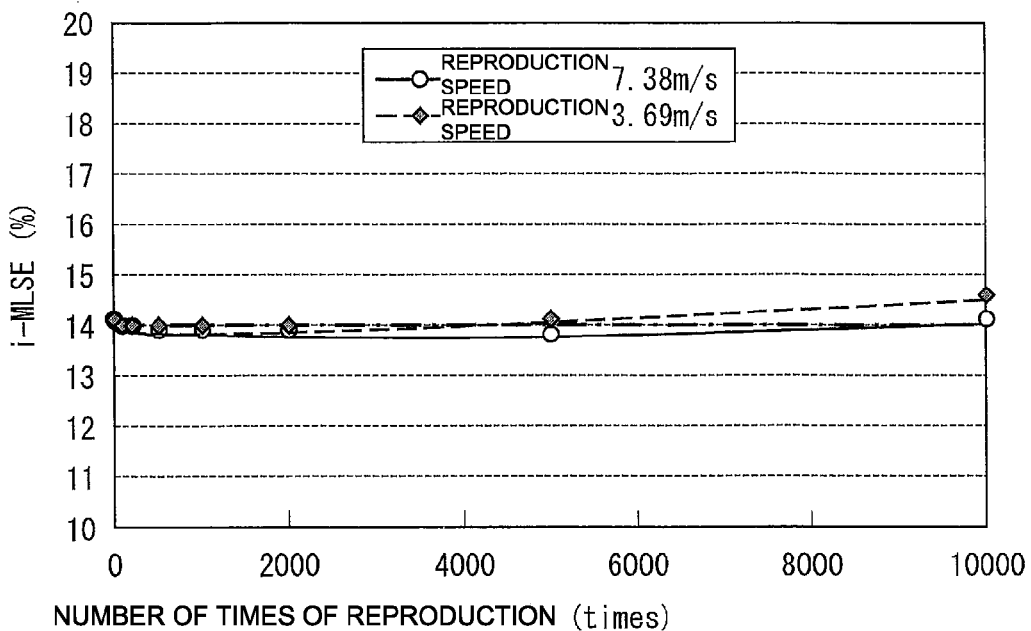
FIG. 4 is a graph of the measurement results of the dependence of the i-MLSE indicating signal performance on the number of times of reproduction in the optical information recording medium.

FIG. 4 is a graph of the measurement results of the dependence of the i-MLSE indicating signal performance on the number of times of reproduction in the optical information recording medium 1. As is clear from FIG. 4, at a reading speed of 3.69 m/s (a reproduction light output of 1.5 mW), the number of times of reproduction that can maintain the value (14%) of the i-MLSE which can be said to be a feasible level as a reproducing medium was about 5000. On the other hand, at a reading speed of 7.38 m/s (a reproduction light output of 2.1 mW), it revealed that the value (14%) of the i-MLSE which can be said to be a feasible level as a reproducing medium could be maintained until reproduction operation was performed about 10000 times which is twice the above-described number of operations.

The results of this verification test reveal that, by increasing a reading speed, it is possible to achieve both super-resolution performance and reproduction durability which are needed for an increase in capacity.

Incidentally, the above results mean that, for the reproduction durability of the super-resolution medium, the influence of a reduction of time in which a laser spot stays in a predetermined area is greater than the influence of an increase of the reproduction light output for super-resolution reproduction that is needed as a result of the reading speed being increased. Therefore, it can be said that, with an increase in reading speed at the time of super-resolution reproduction, the degradation of the super-resolution medium by reproduction is suppressed, that is, the durability of the super-resolution medium is increased.

Embodiment 1

Hereinafter, an embodiment of the present invention will be described in detail.

The Structure of the Optical Information Recording Medium

Figure 5:
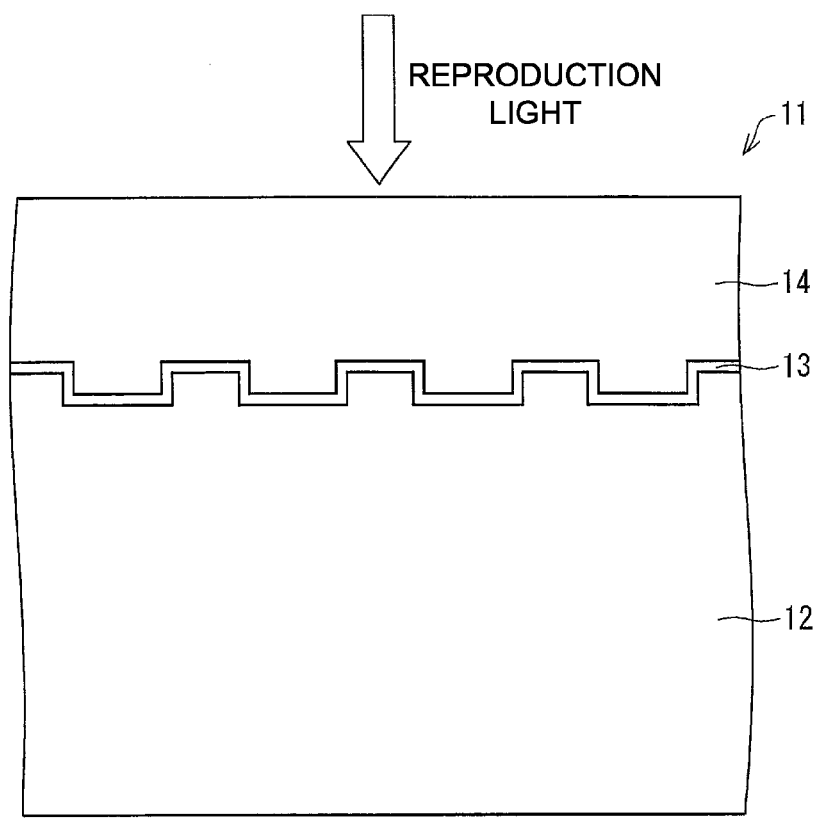
FIG. 5 is a sectional view depicting the structure of an optical information recording medium of an embodiment of the present invention.

FIG. 5 is a sectional view depicting the structure of a read-only optical information recording medium 11 of this embodiment. The optical information recording medium 11 is a plate-shaped disc measuring 120 mm in diameter. In the optical information recording medium 11, the radius of an innermost periphery on which the information is recorded is 24 mm. As depicted in FIG. 5, the optical information recording medium 11 includes a substrate 12, an information recording layer (a functional layer) 13, and a transparent layer 14. On the substrate 12, the information recording layer 13 and the transparent layer 14 are stacked in this order. The optical information recording medium 11 is a super-resolution medium in which the average length of a minimum mark length and a minimum space length is shorter than an optical system resolution limit. The reproduction light enters the optical information recording medium 11 from the side where the transparent layer 14 is located.

On a surface (an information recording surface) of the substrate 12 on the side where the information recording layer 13 is located, a pit group composed of any one of depressions and projections or both having the shapes appropriate to information to be recorded is formed.

The information recording layer 13 is a read-only information recording layer (a ROM layer). The information recording layer 13 is a thin film of a predetermined thickness formed along the pits on the substrate 12 and a functional layer that makes super-resolution reproduction possible. The information recording layer 13 has a shape reflecting the depressions and projections (pits) of the substrate 12 which is a layer under the information recording layer 13. It can also be said that the information recording layer 13 itself forms pits and records information as the shape thereof. The functional layer can be formed by using a single substance or an alloy including at least one element selected from Nb, Mo, W, Mn, Pt, C, Si, Ge, Ti, Zr, V, Cr, Fe, Co, Ni, Pd, Sb, Ta, Al, In, Cu, Sn, Te, Zn, Bi, and so forth or a compound thereof. The appropriate thickness of the information recording layer 13 varies depending on a material used. For example, the information recording layer 13 is formed as a Ta layer measuring 5 nm in thickness by sputtering.

The functional layer which is the information recording layer 13 is a layer that makes it possible to reproduce (read) the information recorded as the pit group by a reproduction optical system of a reproduction apparatus. That is, the functional layer is a super-resolution film that, even when the average length of the minimum mark and the minimum space is less than an optical system resolution limit, makes it possible to reproduce the information recorded as the marks and the spaces by a reproduction optical system (perform super-resolution reproduction). Incidentally, a case where the average length of the minimum mark and the minimum space is shorter than $\lambda/(4 \times NA)$ in the scanning direction of the reproduction apparatus means that it is less than the optical system resolution limit of the reproduction optical system. The optical system resolution limit is sometimes referred to as a resolution limit.

The functional layer which is the information recording layer 13 is a layer that makes it possible to reproduce a pit group including a pit that is less than an optical system resolution limit by the super-resolution reproduction technology described in PTL 1, for example. Alternatively, the functional layer which is the information recording layer 13 is a mask layer that makes it possible to reproduce a pit group including a pit that is less than an optical system resolution limit by reducing a spot diameter of a reproduction light in a pseudo manner by the temperature distribution of an incident reproduction light, for example.

Incidentally, the information recording layer 13 may be a thick layer relative to the depth (height) of a pit. For example, as depicted in FIG. 8, when the information recording layer 13 formed on the substrate 12 is thick, the information recording layer 13 stacked on the depressions and projections of the substrate 12 has, on the lower surface thereof, depressions and projections corresponding to pits 24 of the substrate 12, and the upper surface thereof can be flat. In FIG. 8, on the upper surface of the substrate 12, that is, on the lower surface of the information recording layer 13, a mark 25 represented as the pit 24 and a space 26 represented as spacing between the marks are formed.

Incidentally, the material, the thickness, and the number of layers of the information recording layer (functional layer) 13 are not limited to those described above, and the information recording layer 13 simply has to be a super-resolution film that functions as a layer making super-resolution reproduction possible and makes it possible to reproduce a mark (and a space) formed on the substrate 12. However, if the information recording layer 13 has a functional layer formed of stacked four or more thin films, such as a so-called R medium that allows additional information to be recorded thereon or a so-called RE medium that allows the information to be rewritten, although reproduction durability can be increased easily, this will increase costs. Therefore, it is preferable that the information recording layer 13 is formed of a single layer or about two to three layers.

The transparent layer 14 is a layer that protects an inner layer such as the information recording layer 13 and allows a reproduction light to pass therethrough. The transparent layer 14 has a reproduction light incidence surface and protects the information recording layer 13 and the information recording surface of the substrate 12. Of the layers forming the optical information recording medium 11, the transparent layer 14 is disposed in a position closest to the reproduction light incidence side. A surface of the transparent layer 14, the surface on the side opposite to the side on which the transparent layer 14 is in contact with the information recording layer 13, is the reproduction light incidence surface. The transparent layer 14 is formed of ultraviolet curable resin measuring 100 μm in thickness, for example. The refractive index of this ultraviolet curable resin is 1.50 when a reproduction light wavelength $\lambda=405$ nm. As the material of the transparent layer 14, any material can be used as long as the transmittance thereof is high at a wavelength of the reproduction light. The transparent layer 14 may also be formed of a polycarbonate film and a transparent adhesive, for example.

Moreover, the surface of the transparent layer 14 may have a soil-resistant property and an abrasion-resistant property that do not affect reproduction. The soil-resistant property is a property that prevents a reproduction signal or the like from the information recording layer 13 from degrading even when the information recording layer 13 gets fingerprints or the like thereon. Incidentally, to provide the transparent layer 14 with the soil-resistant property and abrasion-resistant property described above, a hard coating may be provided on the surface of the transparent layer 14.

Moreover, the thickness of the transparent layer 14 may be changed in accordance with the optical system (the reproduction optical system) of the reproduction apparatus for the optical information recording medium 11. Specifically, the transparent layer 14 may be a 0.6-mm polycarbonate layer, for example.

The optical information recording medium 11 is a read-only (read only memory (ROM)) recording medium that allows only reading of information to be performed by the reproduction light.

Information Held in the Optical Information Recording Medium

Figure 6:
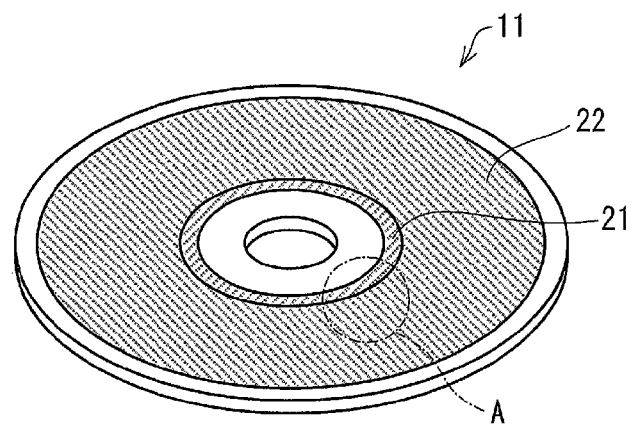
FIG. 6 is a schematic diagram depicting the structure of the optical information recording medium.

FIG. 6 is a schematic diagram depicting the structure of the optical information recording medium 11. The optical information recording medium 11 has a disc information area (a second area) 21 provided on the inner periphery side and a data area (a first area) 22 provided on the outer periphery side thereof. The disc information area 21 is an area from the circumference of a circle with a predetermined radius R1 to the circumference of a circle with a predetermined radius R2 (R1<R2), and the data area 22 is an area from the circumference of the circle with the predetermined radius R2 to the circumference of a circle with a predetermined radius R3 (R2<R3). In each area, information is recorded by a predetermined modulation method as marks represented as pits and spaces of the substrate 12 and the information recording layer 13. Incidentally, the disc information area 21 may be provided on the side closer to the outer periphery than the data area 22.

Figure 7:
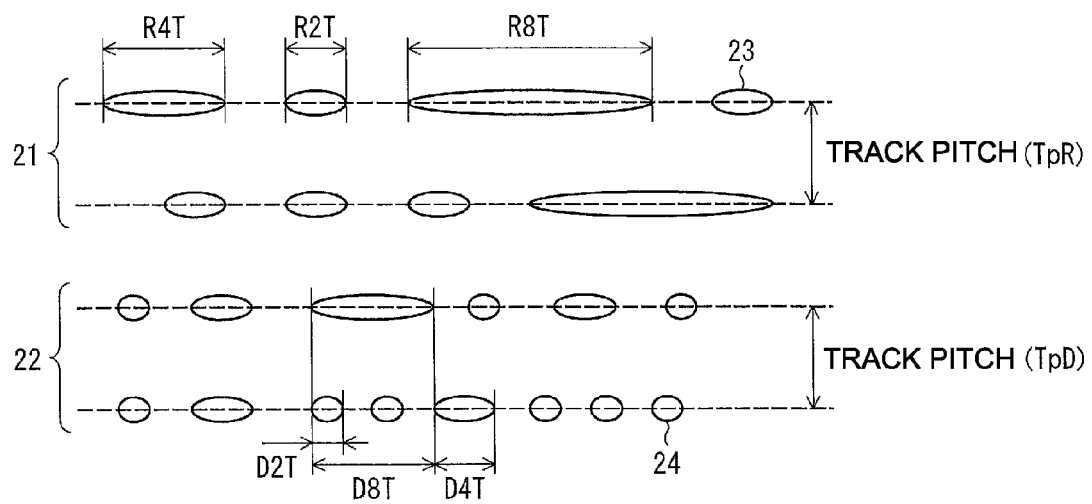
FIG. 7 is a plan view depicting pits in a disc information area and a data area of the optical information recording medium.

FIG. 7 is a plan view depicting pits in the disc information area 21 and the data area 22 of the optical information recording medium 11. In FIG. 7, an area A depicted in FIG. 6 is enlarged and depicted. Information to be recorded is recorded on the optical information recording medium 11 as marks of a plurality of lengths and spaces in accordance with the 1-7RLL modulation method. The pit represents a mark and a spacing between the pits in the scanning direction represents a space.

In the disc information area 21, information is recorded as a pit group 23 composed only of the pits that are longer than a length of $\lambda/(4 \times NA)$ in the scanning direction of the reproduction apparatus. Here, $\lambda$ is the wavelength of a reproduction light and NA is the numerical aperture of an objective lens in the optical system of the corresponding reproduction apparatus. Moreover, $\lambda/(4 \times NA)$ is an optical system resolution limit. That is, the disc information area 21 is an area including only the pits that are longer than the optical system resolution limit. The pit group 23 represents marks of lengths of R2T to R8T and spaces in accordance with the 1-7RLL modulation method.

In the data area 22, information is recorded as a pit group 24 including the pits that are shorter than a length of $\lambda/(4 \times NA)$ in the scanning direction of the reproduction apparatus. That is, the data area 22 is a super-resolution area including the pits that are shorter than the optical system resolution limit. The pit group 24 represents marks of lengths of D2T to D8T and spaces in accordance with the 1-7RLL modulation method. Here, D2T which is the minimum mark length is shorter than the optical system resolution limit $\lambda/(4 \times NA)$.

Incidentally, a case where the average length of the minimum mark length and the minimum space length is smaller than the optical system resolution limit requires super-resolution reproduction. Therefore, the data area may be an area in which the average length of the minimum mark length and the minimum space length is smaller than the optical system resolution limit, and the minimum mark length (minimum pit length) may be greater than the optical system resolution limit.

In the data area 22, a content (for example, video or the like) that is used by the user is recorded.

In the disc information area 21, as information that can be used by the reproduction apparatus, information indicating the reproduction conditions of the optical information recording medium 11 is recorded. The information indicating the reproduction conditions includes information for identifying the type (a BD or a DVD, for example) of the optical information recording medium 11, information on a reproduction light output recommended by the manufacturer of the optical information recording medium 11, and information on a reading speed for performing super-resolution reproduction on the data area 22.

In the disc information area 21 of the optical information recording medium 11, as a reading speed (a linear speed) for reproducing the data area 22, information designating a reading speed in a range from a lower limit: $2 \times (4.92 \times Tm/149)$ [m/s] to less than an upper limit: $(10000/60) \times 2 \times \pi \times (24/1000)$ [m/s]. Here, Tm is the average length (here, D2T) of the minimum mark length and the minimum space length. For example, in the disc information area 21 of the optical information recording medium 11, information on two reading speeds, a reading speed which is an upper limit and a reading speed which is a lower limit, may be recorded in order to designate the range of a reading speed. Alternatively, in the disc information area 21 of the optical information recording medium 11, to designate a reading speed at the time of super-resolution reproduction, information on a preferable one or a plurality of reading speeds in the designated range may be recorded.

Since a reading speed adopted when super-resolution reproduction is performed by using a reading clock for normal single-speed reading is $4.92 \times Tm/149$ [m/s], the lower limit of the above designated range indicates that reading of the information in the data area 22 is performed at more than double speed (the frequency of a reading clock is more than twice).

Moreover, when the radius of an innermost periphery on which the information is recorded is 24 mm (in the case of a normal BD), the upper limit of the above-described designated range indicates that the maximum rotation speed (the rotation speed at the time of reading of the innermost periphery) of the optical information recording medium 11 at the time of reproduction falls within less than 10000 rpm. The limit of the rotation speed of a commonly-known normal disc with a polycarbonate substrate is assumed to be 10000 rpm due to the limit of the strength of polycarbonate. Therefore, at the reading speed within the above-described designated range, it is possible to perform reproduction without damaging the optical information recording medium 11 using a normal polycarbonate substrate by centrifugal force.

When the disc information area 21 whose normal reproduction is possible is reproduced by using a single-speed reading clock (a reading speed is 4.92 [m/s]) and the data area 22 that requires super-resolution reproduction is reproduced at a reading speed in the designated range, reading clocks are different. However, it is preferable that the frequency of a reading clock in super-resolution reproduction is the integral multiple of the frequency of a reading clock at the time of normal reproduction because, by using the same clock as a recording clock which is the integral multiple, it is possible to share a clock generation circuit and thereby curb costs.

Incidentally, if the linear density of the marks and the spaces (the recording density of information) is increased as a result of the marks and the spaces being shortened, it is necessary to increase the frequency of a reading clock at the same reading speed. However, to generate a reading clock with a frequency which is different from that of a basic (single-speed) reading clock separately, it is necessary to add a dedicated clock generation circuit, making it impossible to adjust the frequency of a clock without restraint. Thus, super-resolution reproduction has been performed by slowing down a reading speed (a linear speed) (by changing the rotation speed of a disc) in accordance with a basic reading clock. As a result, in the past, an attempt to increase a reading speed and the frequency of a reading clock at the time of, in particular, super-resolution reproduction has not been actively made.

The reproduction apparatus can recognize the designated range of a reading speed by reading the disc information area 21 of the optical information recording medium 11 and perform super-resolution reproduction of the information in the data area 22 of the optical information recording medium 11 at the reading speed in the designated range. As described above, by increasing the reading speed as the reading speed in the designated range, it is possible to suppress degradation of a disc caused by the heat of the reproduction light while maintaining the super-resolution performance. Therefore, the optical information recording medium 11 has high durability and high reliability in reproduction.

Moreover, in the disc information area 21 of the optical information recording medium 11, information indicating a reproduction light output corresponding to each reading speed (or each range of a reading speed) may be recorded. Incidentally, the reproduction light output indicates energy per unit time of a reproduction light with which the optical information recording medium is irradiated. As the corresponding reproduction light output, the range of the reproduction light output may be designated. The reproduction apparatus can read the designated reading speed and the corresponding reproduction light output from the disc information area 21 and thereby perform super-resolution reproduction of the data area 22 by a reproduction light with appropriate output without irradiating the optical information recording medium 11 with an excessive reproduction light. The reading speed recorded in the disc information area 21 of the optical information recording medium 11 is a reading speed corresponding to a reading clock which is an N-fold speed (N≥2), the reading clock whose frequency is higher than the frequency of a normal single-speed reading clock. However, if a single-speed reading light output is assumed to be P1, a reproduction light output Pn needed for appropriate super-resolution reproduction at a reading speed corresponding to an N-fold speed reading clock is smaller than P1×N and becomes nearly P1×√N. Therefore, it is possible to reduce the amount of received reproduction light per unit time on the optical information recording medium 11 and suppress degradation of the optical information recording medium 11 caused by reproduction. Incidentally, depending on the material, thickness, and the like of the functional layer, the reproduction light output needed for reproduction of the optical information recording medium varies. Therefore, recording a reproduction light output of the optical information recording medium, the reproduction light output in accordance with the reading speed recorded on the optical information recording medium, on the optical information recording medium is useful.

Incidentally, an area in which information on a reading speed is recorded is not limited to the disc information area 21; the information on a reading speed may be recorded in other areas. For example, the information on a reading speed may be recorded in a burst cutting area (BCA) area of the optical information recording medium 11, for example. Moreover, for example, the medium identification information recorded on the optical information recording medium 11 may double as the information on a reading speed. In other words, for example, the medium identification information recorded on the optical information recording medium 11 that requires super-resolution reproduction designates a reading speed in a range from a lower limit: 2×(4.92×Tm/149) [m/s] to less than an upper limit: (10000/60)×2×π×(24/1000) [m/s] corresponding to the optical information recording medium 11.

Incidentally, it is preferable that the disc information area is formed in a position closer to the inner periphery side than the data area for the following reason. In an early stage of reproduction in which an address of an optical information recording medium is not yet obtained, the reproduction apparatus cannot grasp the accurate position of a track which is being read by a pickup due to a pickup's positioning error in the radial direction. In such an early stage of reproduction, to acquire disc information (a reading speed, a reproduction light output, and so forth) needed for reproduction easily, it is necessary simply to record the same information (a reading speed, a reproduction light output, and so forth) on several tracks to handle a pickup's positioning error in the radial direction. However, if the recording position is located on the outer periphery side, mounting recording capacity eventually reduces the recording capacity for a content.

Regarding the Structure of a Pit Group

FIG. 8 is a perspective view depicting the structure of pits provided in the substrate 12 of the optical information recording medium. In FIG. 8, the structure is seen through the information recording layer 13 and the transparent layer 14.

Here, a plurality of pits are referred to as a pit group. Here, a plurality of hollow-like pits are formed in the substrate 12. A portion on the substrate 12 in which a pit is formed corresponds to the mark 25, and a portion (a reflecting surface) between the pits in the scanning direction corresponds to the space 26.

As the marks 25 formed as a pit group, there are a plurality of types of marks of different lengths in the scanning direction. As described above, by combining a plurality of marks 25 of different lengths, it is possible to increase the density at which information is recorded as compared to a so-called monotone pattern recording method formed of marks of a single length.

As described above, by using the plurality of marks 25 of different lengths, in accordance with the 1-7RLL modulation method, for example, information is recorded by a mark edge recording method. As for the information recorded by the mark edge recording method, information ("1" (positive) or "0" (negative)) is read by reading an edge portion of the mark 25 (a boundary portion between the mark 25 and the adjacent space 26).

As described above, by using the mark edge recording method, it is possible to increase the capacity of information that can be recorded as compared to a mark position recording method used in the monotone pattern recording method.

In the data area 22, the pit group is formed such that the average length of a minimum mark of the plurality of types of marks 25, the minimum mark of a minimum length in the scanning direction, and a minimum space of the plurality of types of spaces 26, the minimum space of a minimum length in the scanning direction, the average length in the scanning direction, becomes less than the optical system resolution limit of the reproduction optical system.

As a result, the optical information recording medium 11 can increase the density of the marks 25 and the spaces 26 as compared to a recording medium on which information is recorded as a pit group that can perform normal reproduction which is not super-resolution reproduction. Therefore, the optical information recording medium 11 can increase the capacity for recording a content used by the user.

Here, the average length of the minimum mark and the minimum space can be calculated from the modulation method and the density of the information recorded in the data area 22. For example, in the case of the 1-7RLL modulation method, the average length of the minimum mark and the minimum space is structurally the average length of a 2T mark length which is the minimum mark and a 2T space length which is the minimum space.

Specifically, when the reproduction optical system conforms to the BD, in the normal BD-ROM (a recording capacity: 25 GB, a disc diameter: 120 mm) which is a non-super-resolution medium, the average length of the 2T mark length and the 2T space length in the 1-7RLL modulation method is 149 nm. In the above-described optical information recording medium 1 (a recording capacity: 33.3 GB, a disc diameter: 120 mm) for super-resolution reproduction, the average length Tm of the 2T mark length and the 2T space length in the 1-7RLL modulation method is 112 nm (=149×25/33.3).

Incidentally, the optical information recording medium can also be configured as a two-layered (or multilayered) optical information recording medium having two or more information recording layers. In this case, at least any one of the information recording layers has an area in which a pit group for super-resolution reproduction is formed. Moreover, between the plurality of information recording layers, an intermediate layer to separate the information recording layers is provided, and pits are formed in a surface (an upper surface) of the intermediate layer on the side where one information recording layer is located.

Embodiment 2

Another embodiment of the present invention will be described below. Incidentally, for the purpose of illustration, members and structures having the same functions as those in the drawings described in embodiment 1 will be identified with the same characters, and their detailed descriptions will be omitted. In this embodiment, a reproduction apparatus supporting the optical information recording medium of embodiment 1 will be described.

The Configuration of the Reproduction Apparatus

Figure 9:
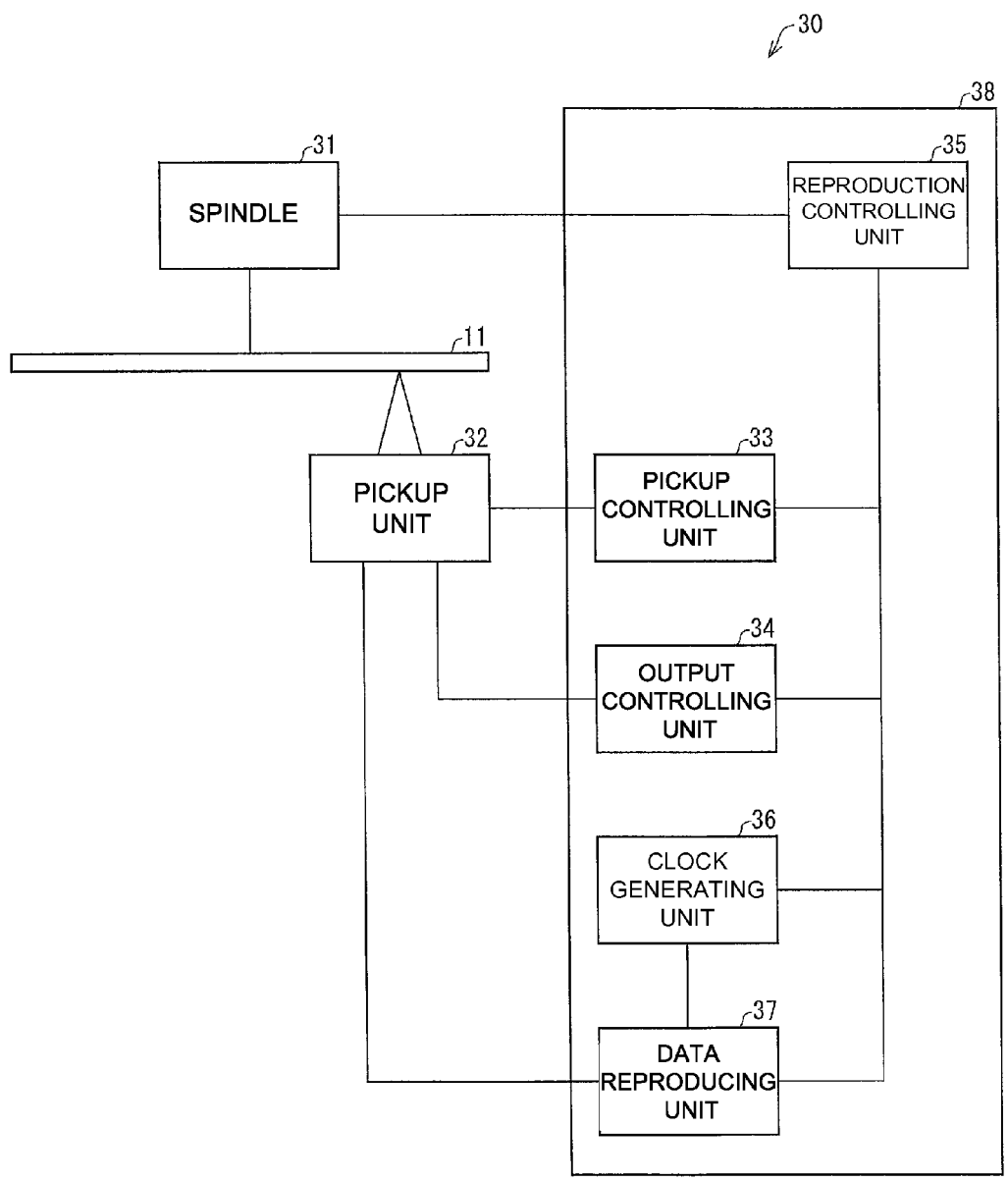
FIG. 9 is a block diagram depicting the schematic configuration of a reproduction apparatus of another embodiment of the present invention.

FIG. 9 is a block diagram depicting the schematic configuration of a reproduction apparatus 30 of this embodiment. The reproduction apparatus (the optical information recording medium reproduction apparatus) 30 records and reproduces information on and from the optical information recording medium 11. The reproduction apparatus 30 includes a spindle 31, a pickup unit 32, and a control unit (a reproducing unit) 38. The control unit 38 includes a pickup controlling unit 33, an output controlling unit 34, a reproduction controlling unit 35, a clock generating unit 36, and a data reproducing unit 37.

The spindle 31 rotates the optical information recording medium 11 loaded in the reproduction apparatus 30 at a rotational speed (a rotation speed) designated by the reproduction controlling unit 35.

The pickup unit 32 includes a laser light source for a reproduction light, a light collection optical system including an objective lens, a light-receiving element, and so forth (which are not depicted). The numerical aperture of the objective lens is 0.85, and the wavelength of the reproduction light is 405 nm. The pickup unit 32 irradiates the optical information recording medium 11 loaded in the reproduction apparatus 30 with a reproduction light, receives the reflected light with the light-receiving element, and obtains an electrical signal indicating the intensity of the reflected light. The pickup unit 32 outputs an electrical signal indicating the intensity of the reflected light to the data reproducing unit 37.

The pickup controlling unit 33 controls the position of the pickup unit 32 and moves the pickup unit 32 to a position corresponding to the track of the optical information recording medium 11.

The output controlling unit 34 controls laser output of the laser light source of the pickup unit 32 in such a way that the optical information recording medium 11 is irradiated with the reproduction light with an intended intensity.

The reproduction controlling unit 35 determines a position (track) to be reproduced on the optical information recording medium 11. The reproduction controlling unit 35 determines the reading speed (the linear speed) based on whether the track to be produced is the disc information area or the data area and based on the radius of the track to be reproduced. The reproduction controlling unit 35 rotates the spindle 31 in accordance with the reading speed thus determined. Moreover, the reproduction controlling unit 35 outputs, to the pickup controlling unit 33, the information on the radius of the track to be reproduced.

The clock generating unit 36 generates a reading clock and outputs the reading clock to the data reproducing unit 37.

The data reproducing unit 37 reproduces the information read from the optical information recording medium 11 by using the waveform electrical signal indicating the intensity of the reflected light and the reading clock.

Reproduction Processing Flow

Figure 10:
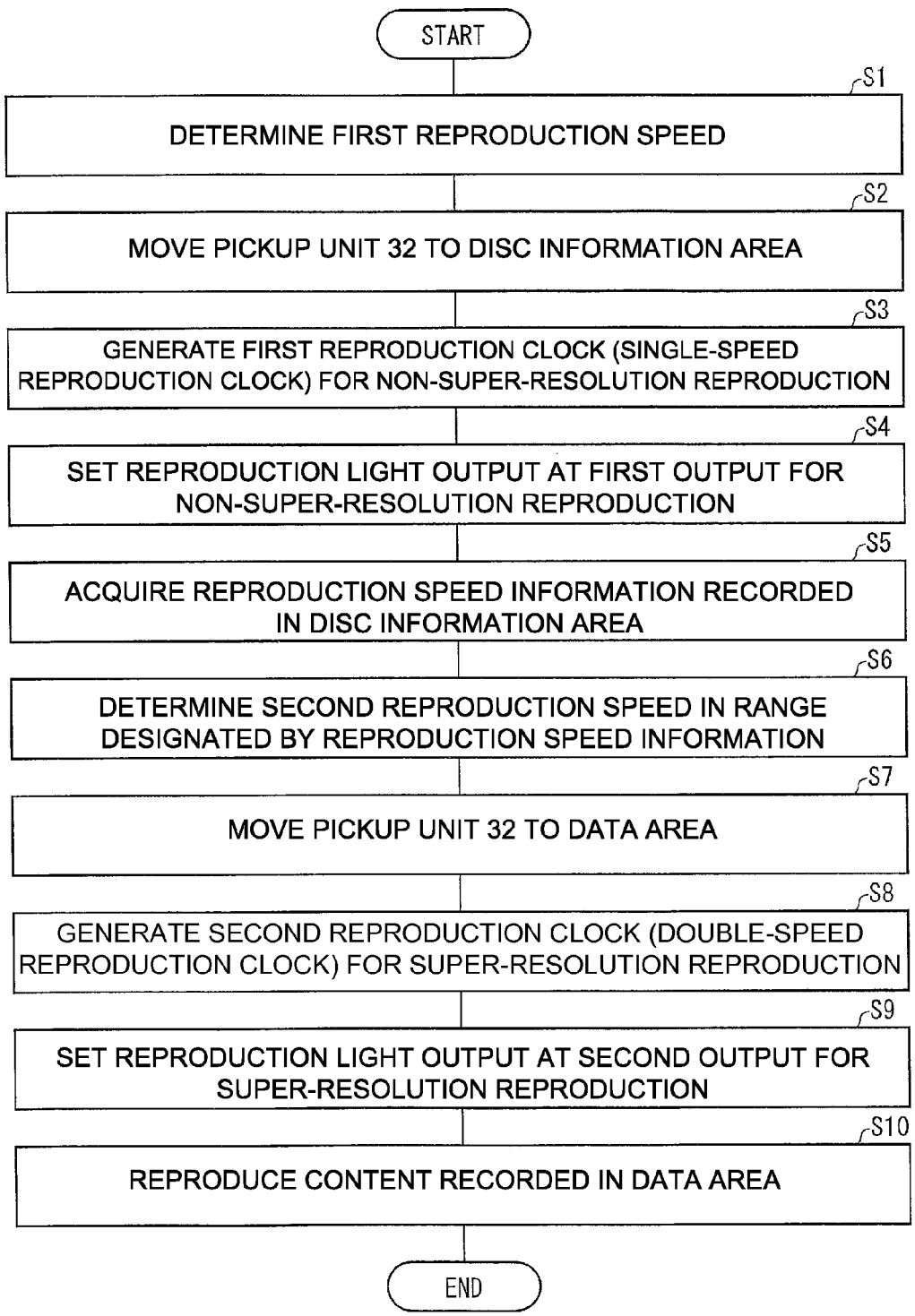
FIG. 10 is a diagram describing the flow of reproduction processing of the reproduction apparatus.

FIG. 10 is a diagram describing the flow of reproduction processing of the reproduction apparatus 30.

When the optical information recording medium 11 is loaded into the reproduction apparatus 30, the reproduction apparatus 30 first reproduces the information in the disc information area of the optical information recording medium 11 at a predetermined first reading speed (4.92 [m/s]).

Specifically, the reproduction controlling unit 35 provides the pickup controlling unit 33 with an instruction to reproduce a track in the disc information area. Moreover, the reproduction controlling unit 35 notifies the output controlling unit 34 and the clock generating unit 36 that the track to be reproduced is a non-super-resolution reproduction area. Furthermore, the reproduction controlling unit 35 determines the reading speed as a first reading speed and rotates the spindle 31 in accordance with the reading speed thus determined (S1).

The pickup controlling unit 33 moves the pickup unit 32 to the position of the designated track in the disc information area by controlling the pickup unit 32 (S2).

The clock generating unit 36 generates a first reading clock (a single-speed reading clock) for non-super-resolution reproduction and outputs the first reading clock to the data reproducing unit 37 (S3).

The output controlling unit 34 sets the output of the reproduction light at a first output for non-super-resolution reproduction (S4).

The data reproducing unit 37 reproduces the information recorded in the disc information area by using the electrical signal indicating the intensity of the reflected light and the first reading clock and acquires the reading speed information recorded in the disc information area (S5). The data reproducing unit 37 outputs the reading speed information to the reproduction controlling unit 35. Here, the reading speed information indicates $2\times(4.92\times Tm/149)$ [m/s] (or more) as a lower limit of the reading speed and indicates (less than) $(10000/60)\times 2\times \pi \times(24/1000)$ [m/s] as an upper limit of the reading speed. Moreover, the data reproducing unit 37 acquires the information on the reproduction light output recorded in the disc information area. The data reproducing unit 37 outputs the information on the reproduction light output to the output controlling unit 34. The information on the reproduction light output indicates a reproduction light output recommended by the manufacturer of the optical information recording medium 11.

The reproduction apparatus 30 reproduces the information in the data area (the super-resolution area) of the optical information recording medium 11 at a second reading speed in the above-described range indicated by the reading speed information.

Specifically, the reproduction controlling unit 35 provides the pickup controlling unit 33 with an instruction to reproduce a track in the data area. Moreover, the reproduction controlling unit 35 notifies the output controlling unit 34 and the clock generating unit 36 that the track to be reproduced is a super-resolution reproduction area. Furthermore, the reproduction controlling unit 35 determines a reading speed in the range designated by the reading speed information as a second reading speed (for example, $2\times(4.92\times Tm/149)$ [m/s]) based on the reading speed information read from the optical information recording medium 11 and rotates the spindle 31 in accordance with the reading speed thus determined (S6). The reproduction controlling unit 35 outputs the information indicating the determined reading speed to the clock generating unit 36.

The pickup controlling unit 33 moves the pickup unit 32 to the position of the designated track in the data area by controlling the pickup unit 32 (S7).

The clock generating unit 36 generates a second reading clock (for example, a double-speed reading clock) for super-resolution reproduction in accordance with the second reading speed (S8). The clock generating unit 36 outputs the second reading clock to the data reproducing unit 37.

The output controlling unit 34 sets the output of the reproduction light at a second output for super-resolution reproduction based on the information on the reproduction light output (S9). The second output is greater than the first output.

The data reproducing unit 37 reproduces the content recorded in the data area by using the electrical signal indicating the intensity of the reflected light and the second reading clock (S10).

As described above, the reproduction apparatus 30 can perform super-resolution reproduction of the data area at a reading speed in a range suitable for the optical information recording medium 11, the reading speed recorded in the disc information area, and with the reproduction light output suitable for the reading speed. Specifically, the reproduction apparatus 30 performs super-resolution reproduction at a reading speed which is more than or equal to a reading speed ($2\times(4.92\times Tm/149)$ [m/s]) corresponding to the double-speed reading clock. Therefore, in the reproduction apparatus 30, as compared to a case where super-resolution reproduction is performed at a reading speed corresponding to a single-speed reading clock, it is possible to decrease the energy of the reproduction light with which a unit area is irradiated at the time of reproduction. Therefore, it is possible to suppress degradation caused by reproduction of the optical information recording medium 11. Moreover, the reproduction apparatus 30 performs super-resolution reproduction at a reading speed at which the rotation speed of the optical information recording medium 11 becomes less than 10000 rpm. This makes it possible to prevent a breakdown of the optical information recording medium 11 caused by centrifugal force of rotation. Thus, the reproduction apparatus 30 can increase the reliability of reproduction.

Modified Examples

Incidentally, if information on a plurality of reading speeds for super-resolution reproduction and information on a plurality of reproduction light outputs corresponding to the reading speeds are recorded in the disc information area of the optical information recording medium, the reproduction apparatus may be configured to determine the most reliable reading speed and reproduction light output based on the performance of a driving unit such as a spindle and the performance of a laser light source (an upper limit of a reproduction light output at which irradiation thereof is possible). By doing so, the reproduction apparatus can perform super-resolution reproduction of the data area at the most reliable reading speed and reproduction light output.

Incidentally, the optical information recording medium can also be configured to record the information on the reading clock corresponding to each reading speed in the disc information area. In this case, the reproduction apparatus can perform super-resolution reproduction of the data area based on the reading speed and the reading clock which were read from the disc information area.

Incidentally, at the time of super-resolution reproduction, the output controlling unit 34 may change the reproduction light output in such a way as to increase the reproduction light output and determine a reproduction light output with which the carrier to noise (C/N) ratio of a signal exceeds a threshold value as a reproduction light output for super-resolution reproduction. In this case, the information on the reproduction light output may not be recorded on the optical information recording medium.

The output controlling unit may be configured to determine a reproduction light output in such a way that, irrespective of the information on the reproduction light output, if a reproduction light output corresponding to a first reading speed ($4.92\times Tm/149$) [m/s] corresponding to a single-speed clock is set as a first reproduction light output, at the time of reproduction of the content of the data area, the increase ratio of the reproduction light output to the first reproduction light output becomes smaller than the increase ratio of the reading speed to the first reading speed.

Moreover, the reproduction apparatus may first make an attempt to reproduce the optical information recording medium at a reading speed and a reading clock and with a reproduction light output for normal non-super-resolution reproduction. The reproduction apparatus may be configured to perform super-resolution reproduction of the optical information recording medium at a reading speed and a reading clock and with a reproduction light output for super-resolution reproduction if the reproduction apparatus cannot reproduce the information by non-super-resolution reproduction. The reading speed for super-resolution reproduction is a reading speed that is $2\times(4.92\times Tm/149)$ [m/s] or more but less than $(10000/60)\times 2\times\pi\times(24/1000)$ [m/s]. With this reproduction apparatus, even when an optical information recording medium that does not have a disc information area for non-super-resolution reproduction and only has a data area for super-resolution reproduction is reproduced, it is possible to perform super-resolution reproduction of the optical information recording medium at an appropriate reading speed. Incidentally, switching between non-super-resolution reproduction and super-resolution reproduction (switching of a reading speed) may be manually designated by the user or may be performed with any timing or by any means.

Moreover, in the disc information area, reading speed information may be recorded as a pit group including a pit that is less than an optical system resolution limit. Since the disc information area is an area that is read only in the early stage of reproduction, the number of times of reproduction thereof is smaller than that of the data area in which the content is recorded. Thus, even when the reproduction apparatus reads the information in the disc information area by super-resolution reproduction at a reading speed corresponding to a single-speed reading clock, the amount of accumulated irradiation of a reproduction light is smaller than that of the data area, and the disc information area suffers less from degradation at the time of reproduction.

The present invention is not limited to the embodiments described above and can be changed in various ways in the scope of the claims. Any embodiment that is obtained by appropriately combining the technical means disclosed in the different embodiments also falls within the technical scope of the present invention.

INDUSTRIAL APPLICABILITY

The present invention can be applied, in particular, to a high information recording density read-only optical information recording medium.

REFERENCE SIGNS LIST 1, 11 optical information recording medium
2, 12 substrate
3, 13 information recording layer (functional layer)
4, 14 transparent layer
21 disc information area (second area)
22 data area (first area)
23, 24 pit
25 mark
26 space
30 reproduction apparatus (optical information recording medium reproduction apparatus)
31 spindle
32 pickup unit
33 pickup controlling unit
34 output controlling unit
35 reproduction controlling unit
36 clock generating unit
37 data reproducing unit
38 control unit (reproducing unit)

The invention claimed is:

1. A read-only optical information recording medium on which a content is recorded as a pit group formed such that an average length Tm [nm] of a minimum mark length and a minimum space length becomes shorter than an optical system resolution limit of a reproduction apparatus in which a numerical aperture of an objective lens is 0.85 and a wavelength of a reproduction light is 405 [nm], wherein
  as a reading speed for reproducing the content, reading speed information designating a reading speed in a range from $2\times(4.92\times Tm/149)$ [m/s] to less than $(10000/60)\times 2\times\pi\times(24/1000)$ [m/s] is recorded,
  reproduction light output information designating a reproduction light output corresponding to the reading speed indicated by the reading speed information is recorded, and
  a frequency of a reading clock corresponding to the reading speed indicated by the reading speed information is an n multiple (n is an integer of 2 or more) of a frequency of a reading clock corresponding to a reading speed for reading the pit group formed such that the average length of the minimum mark length and the minimum space length is not less than the optical system resolution limit.

2. The optical information recording medium according to claim 1, wherein
  the content is recorded as a pit group including a pit whose length in a scanning direction is shorter than the optical system resolution limit of the reproduction apparatus.

3. A reproduction method for reproducing a read-only optical information recording medium on which a content is recorded as a pit group formed such that an average length Tm [nm] of the minimum mark length and the minimum space length becomes shorter than an optical system resolution limit of a reproduction apparatus in which a numerical aperture of an objective lens is 0.85 and a wavelength of a reproduction light is 405 [nm], wherein
  the content is reproduced at a reading speed that is $2\times(4.92\times Tm/149)$ [m/s] or more but less than $(10000/60)\times 2\times\pi\times(24/1000)$ [m/s] by irradiating the optical information recording medium with the reproduction light with a wavelength of 405 [nm] via the objective lens with a numerical aperture of 0.85,
  the reproduction light is emitted at a reproduction light output corresponding to the reading speed, and
  a frequency of a reading clock corresponding to the reading speed is an n multiple (n is an integer of 2 or more) of a frequency of a reading clock corresponding to a reading speed for reading the pit group formed such that the average length of the minimum mark length and the minimum space length is not less than the optical system resolution limit.

* * * * *